United States Patent
Li et al.

(10) Patent No.: US 8,335,191 B2
(45) Date of Patent: Dec. 18, 2012

(54) ACCESS NETWORK HANDOVER FOR A MOBILE TELEVISION SYSTEM

(75) Inventors: Jun Li, Indianapolis, IN (US); Kai Xie, Beijing (CN); Yun Tao Shi, Beijing (CN); Si Nan Shangguan, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 268 days.

(21) Appl. No.: 12/678,827

(22) PCT Filed: Sep. 16, 2008

(86) PCT No.: PCT/US2008/010773
§ 371 (c)(1),
(2), (4) Date: Mar. 18, 2010

(87) PCT Pub. No.: WO2009/038698
PCT Pub. Date: Mar. 26, 2009

(65) Prior Publication Data
US 2010/0215021 A1 Aug. 26, 2010

(30) Foreign Application Priority Data
Sep. 18, 2007 (EP) .................................. 07301374

(51) Int. Cl.
*H04W 4/00* (2009.01)
(52) U.S. Cl. ...................................................... 370/331
(58) Field of Classification Search .................. None
See application file for complete search history.

(56) References Cited

U.S. PATENT DOCUMENTS

| | | | |
|---|---|---|---|
| 7,260,074 B2* | 8/2007 | Vare | 370/331 |
| 7,916,166 B1* | 3/2011 | Habib et al. | 348/14.08 |
| 8,085,678 B2 | 12/2011 | Spindola et al. | |
| 2003/0206549 A1 | 11/2003 | Mody | |
| 2004/0037246 A1 | 2/2004 | Grilli | |
| 2007/0248049 A1* | 10/2007 | Fajardo et al. | 370/331 |
| 2008/0088408 A1* | 4/2008 | Backman | 340/2.23 |
| 2008/0151845 A1* | 6/2008 | Jaakkola et al. | 370/338 |

FOREIGN PATENT DOCUMENTS

| | | |
|---|---|---|
| EP | 1622315 A1 | 2/2006 |
| EP | 1826930 A2 | 8/2007 |
| JP | 2004128579 A2 | 4/2004 |
| JP | 2005311580 A2 | 11/2005 |
| WO | 2004019635 A2 | 3/2004 |
| WO | 2004/112417 A1 | 12/2004 |
| WO | 2005115038 A1 | 12/2005 |
| WO | 2006044696 A2 | 4/2006 |

OTHER PUBLICATIONS

International Search Report dated Oct. 27, 2008.

* cited by examiner

*Primary Examiner* — Raj Jain
(74) *Attorney, Agent, or Firm* — Robert D. Shedd; Jeffrey M. Navon; Catherine A. Cooper

(57) ABSTRACT

A method and apparatus are described for content delivery, including receiving content from a first network, moving into a coverage area of a second network, performing a handover, receiving content from the second network and dropping any duplicate content packets. Also described are a method and apparatus for content delivery including receiving content from a first network, performing a handover, receiving content from a second network, determining if any content is missing and requesting the missing content.

21 Claims, 7 Drawing Sheets

Handover from DVB-H network to WiFi network

Handover from WiFi network to DVB-H network even though
ACCESS NETWORK HANDOVER FOR A MOBILE TELEVISION SYSTEM This application claims the benefit, under 35 U.S.C. §119 of European Patent Application 07301374.0, filed Sep. 18, 2007.

FIELD OF THE INVENTION

The present invention relates to access network handover mechanisms for mobile TV, and in particular, to handover mechanisms which allow a dual mode terminal to switch from one network to another network with minimal interruption of the program being watched.

BACKGROUND OF THE INVENTION

WiFi has been used to describe the embedded technology for wireless local area networks based on IEEE 802.11. Recently, the term WiFi has been broadened to include and describe the generic wireless interface of mobile computing devices, such a laptops, personal digital assistants (PDAs) and mobile terminals including cell phones, within the context of wireless local area network connectivity and usage. Common uses for WiFi include Internet access, voice-over-IP (Internet protocol) (VOIP) phone access, gaming and network connectivity for consumer electronics including televisions, multimedia access players and recorders and digital cameras (still and motion).

Digital Video Broadcasting-Handheld (DVB-H) is the technical specification for the provision of broadcasting services to handheld receivers including handheld consumer electronics such as televisions and multimedia access players and recorders.

SUMMARY OF THE INVENTION

As more portable devices become WiFi capable, the number of WiFi access networks is rapidly growing as well. Extending a mobile television (TV) system, such as a DVB-H system, to WiFi networks can extend the coverage of mobile TV programs. When a mobile device/terminal has both mobile TV (e.g. DVB-H) and WiFi interfaces, WiFi access can be used as an alternative interface, especially when the DVB-H signal is not of sufficient strength and/or quality. As used herein, "/" denotes alternative names for the same or similar components or structures. That is, a "/" can be taken as meaning "or" as used herein.

The present invention is, thus, directed towards the handover mechanisms for mobile TV so that a dual mode terminal can switch from one network to another network with minimal interruption of the program being watched.

It would be advantageous, to have the user experience seamless handover from one access network to another if both offer the same TV program. It would be further advantageous during access handover to synchronize video streams from two access networks with appropriate buffers, so that the TV program can be viewed continuously.

A method and apparatus are described for content delivery, including receiving content from a first network, moving into a coverage area of a second network, performing a handover, receiving content from the second network and dropping any duplicate content packets. Also described are a method and apparatus for content delivery including receiving content from a first network, performing a handover, receiving content from a second network, determining if any content is missing and requesting the missing content.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
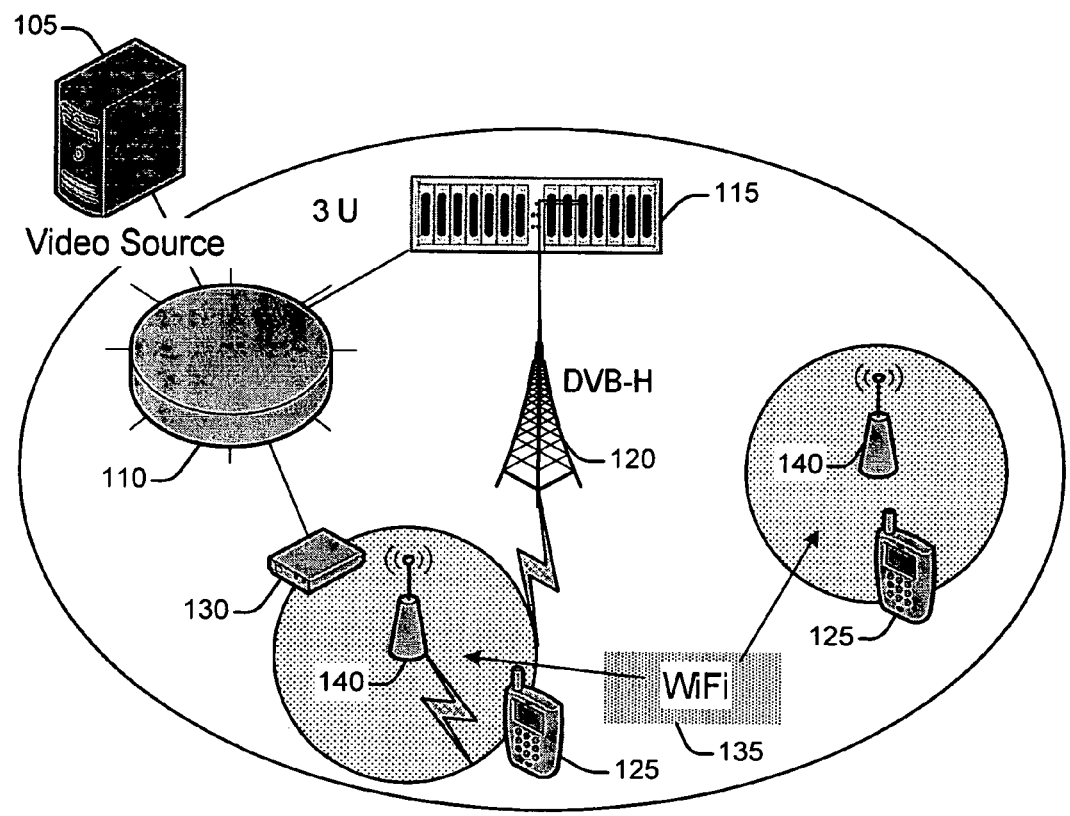
FIG. 1 shows a DVB-H and WiFi mobile television overlay.

FIG. 1 shows the overlay of the WiFi coverage area in the DVB-H coverage area, where DVB-H is an example of public mobile TV. In this scenario, a mobile terminal can access TV programs that are broadcast/multicast from either or both the DVB-H system and/or one or more WiFi networks. However, WiFi access is only available in hotspots, where the DVB-H signal strength may not be of sufficient quality, especially indoors. That is, a program or any signal that is broadcast is transmitted to all available receivers of such a signal. Multicast is transmitted to a subset of all of the available receivers. The subset of all available receivers may, in fact, be the entire set of all receivers. Thus, multicast is broader as it encompasses/includes the concept of broadcast.

Referring still to FIG. 1, the video source 105 is a server providing video and/or multimedia source, generically termed "content". The disc shaped device 110 is an abstract of the backbone network. The server is in communication with the headend 115 via the backbone network 110. The headend 115 multicasts/broadcasts the content via broadcast/multicast towers 120 of the DVB-H system to mobile devices/terminals 125 enabled to receive the content. The server is also in communication with switches 130 located in hotspots. The server 105, the headend 115, which communicates with a DVB-H network, and a switch 130, which is in a hotspot (WiFi network 135), are all connected via the backbone network. The mobile device/terminal in the rightmost hotspot is receiving the content from the DVB-H network even though it is in a hotspot. The mobile device/terminal located in the leftmost hotspot is able to select whether it receives the program from the WiFi hotpot or the DVB-H system. The mobile terminal/device receives the program in the WiFi hotspot via a WiFi access point 140. A user of a mobile terminal/device can make that selection or the mobile terminal/device can automatically switch between the access networks based on signal quality.

Figure 2:
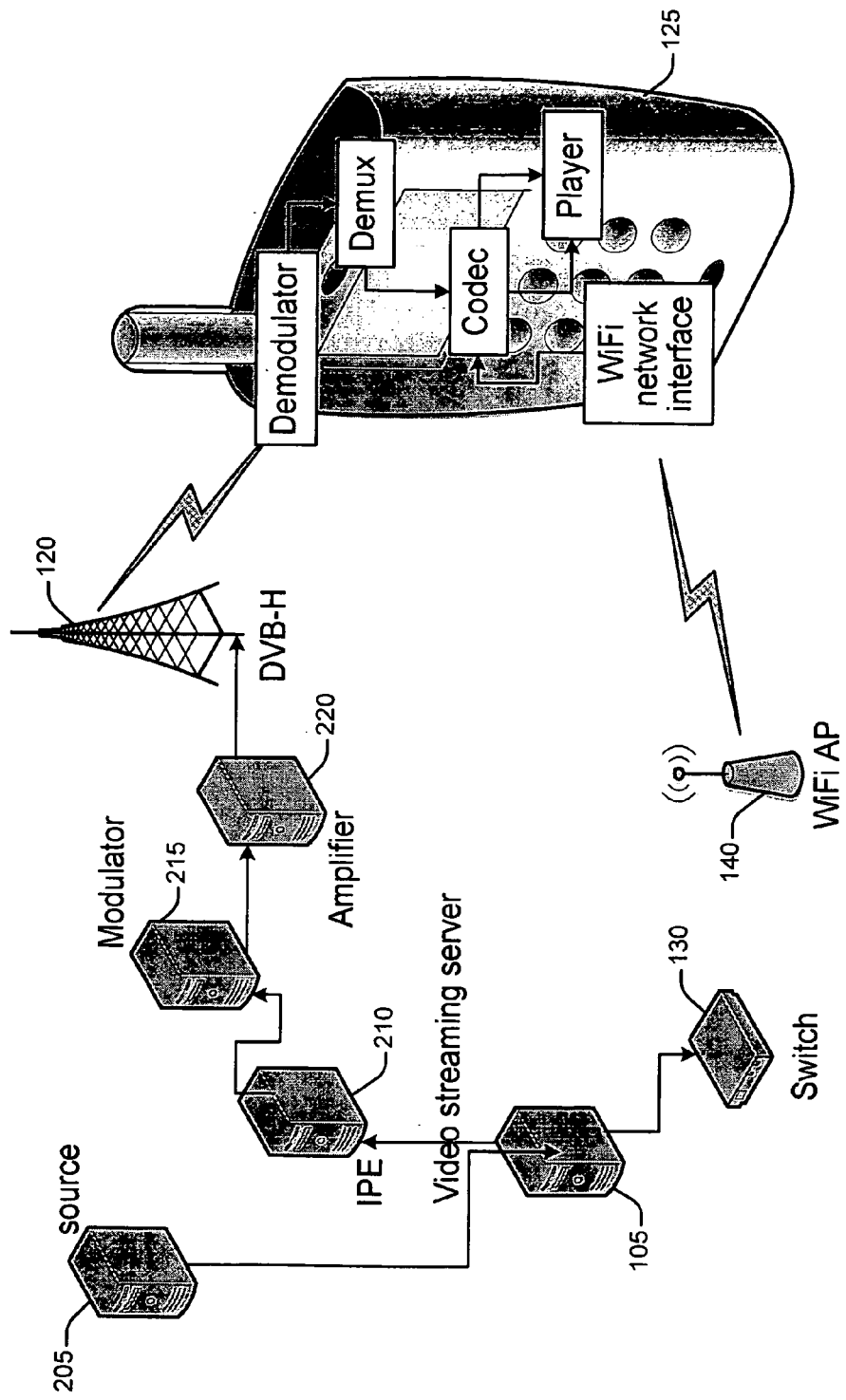
FIG. 2 depicts the system components for mobile TV using an exemplary dual mode mobile terminal/device.

Referring now to FIG. 2, source 205 transmits content to a video streaming server 105, which forwards the content to both a switch 130 and the headend which includes an Internet Protocol (IP) encapsulator (IPE) 210, a modulator 215, an amplifier 220 and a DVB-H tower 120. The server transmits content to both the switch 130 and the headend via the backbone network (not shown in FIG. 2). An exemplary mobile device/terminal is for example a dual mode wireless telephone 125. It should be noted yet again that any mobile device/terminal that can receive mobile TV and uses the dual protocol stack of the present invention can be used. The switch 130 transmits content to the mobile terminal/device 125 via WiFi access point 140. The dual mode mobile terminal/device has two protocol stacks. One protocol stack is for receiving mobile TV via the DVB-H network and the second protocol stack is for receiving mobile TV in a hotspot via a WiFi network. The exemplary dual mode mobile terminal/device 125 depicted in FIG. 2 has a demodulator, a demultiplexer, a codec, a multimedia player and a WiFi interface. The headend has correspondingly a multiplexer and a codec (not shown).

Figure 3A:
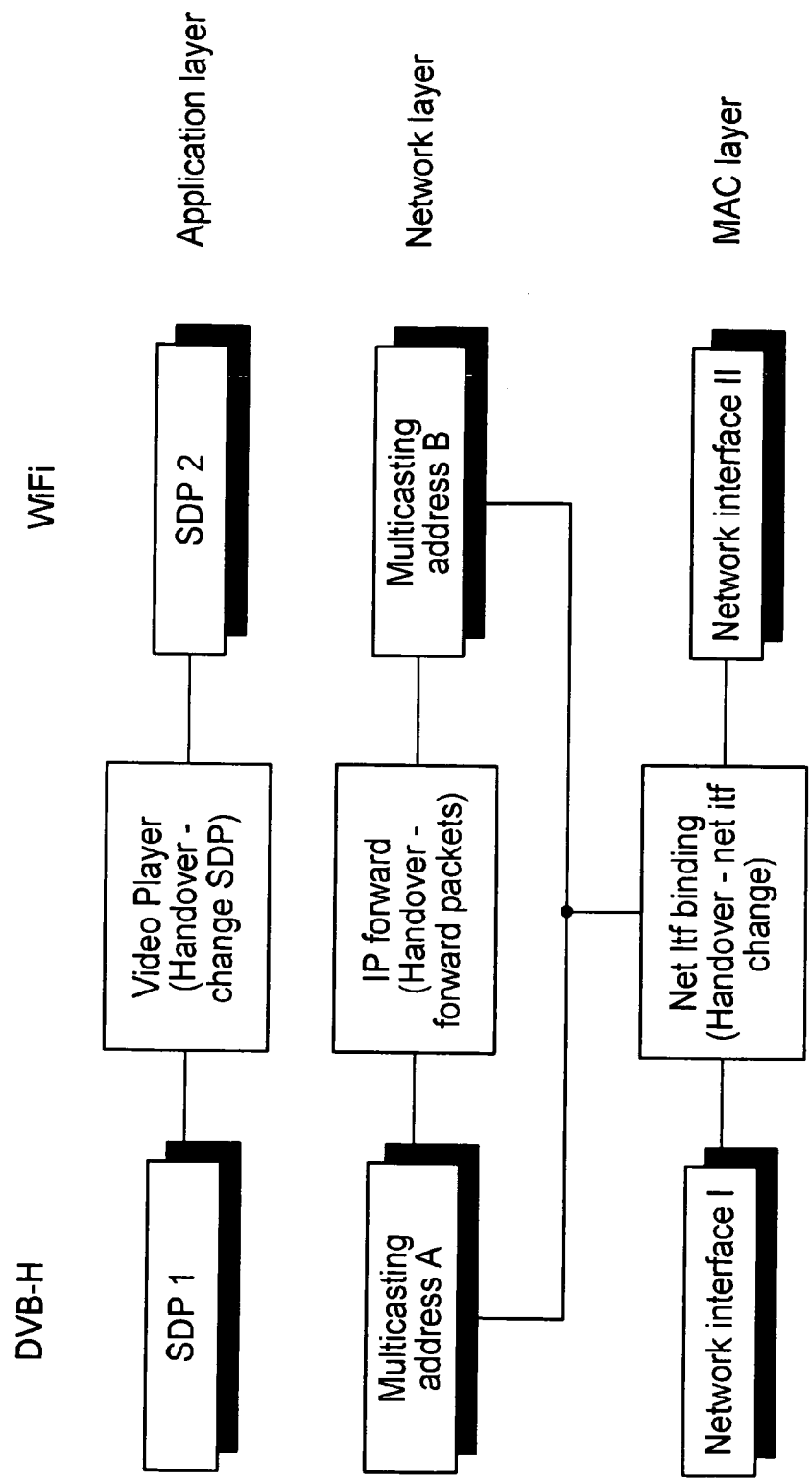
FIG. 3A depicts an access network switch at different levels.

When it is necessary to switch from one access network to another for some reason, such as lower/reduced signal strength for the desired program transmitted by one of the networks, as shown in FIG. 3A, the video streams (content) can be switched between the two access networks (WiFi and DVB-H) at different protocol levels. A mobile TV service through the DVB-H network usually has an electronic service guide (ESG) containing all program information for the service and which is broadcast periodically to the mobile terminals. Through an ESG, a mobile terminal is able to determine what content a program (also conventionally called a channel) is broadcasting and how to access that content. Through the WiFi access network, an ESG is also broadcast for the programs available via the WiFi network. The ESG broadcast over/by the WiFi network is the same ESG or an adaptation of the DVB-H ESG. A mobile terminal receiving ESGs from both DVB-H and WiFi network will be able to determine if a program is available from both DVB-H and WiFi access networks, then it is possible that the program can be continuously viewed while the access network is switched from one to the other.

The handover can be made at different protocol levels as follows:

1) Application layer: A multicast TV program is associated/paired with a Session Description Protocol (SDP) file describing the video stream (content) information, or any file containing the video stream information required to identify a multicasting session. The program from DVB-H and the program from WiFi may have different SDP files. A user can select an access network for viewing a TV program by using the corresponding SDP file. This approach may introduce delays, which are at least equal to the initial delay for changing a channel. The handover is, thus, is not transparent to the user.

2) Network layer: Assuming the pairing of SDP files for one TV program. That is, assuming that the ESG knows which SDP files correspond to the desired program in both the WiFi coverage area and the DVB-H coverage area and that the ESG "pairs/associates" the SDP files, when an access network switch occurs, by either automatic detection based on signal strength or user selection, for a short period of time, such as few seconds, the packets from the address A for the old access network are forwarded to the address B for the new access network. From the address B, packets from both access networks may arrive for a short period of time. It is necessary to remove the duplicate packets. In case of streams (content) from two access networks, which are not synchronized, a buffering mechanism is required to ensure a smooth handover. An exemplary buffering technique is described below. This approach offers a transparent handover to the user and it may, thus, be possible to avoid interruption of service.

3) Media Access Control (MAC) layer: If the same SDP file can be used for both DVB-H and WiFi networks for the same TV program, which implies the same multicasting address is used, the address is bundled with one network interface at a time, receiving the video stream (content) from the corresponding access network. In order to reduce the interruption for continuous playback, it may be possible to let one address be bundled with both network interfaces for a short period of time. One socket for one network interface can be created and all sockets can be made to join the multicast group to receive data. In this case, a mobile terminal/device receives data from all network connections and the data from different network connections are duplicated. The removal of duplicate packets is performed and a buffering technique applied as well. This approach is transparent to the user as well as the application.

Figure 3B:
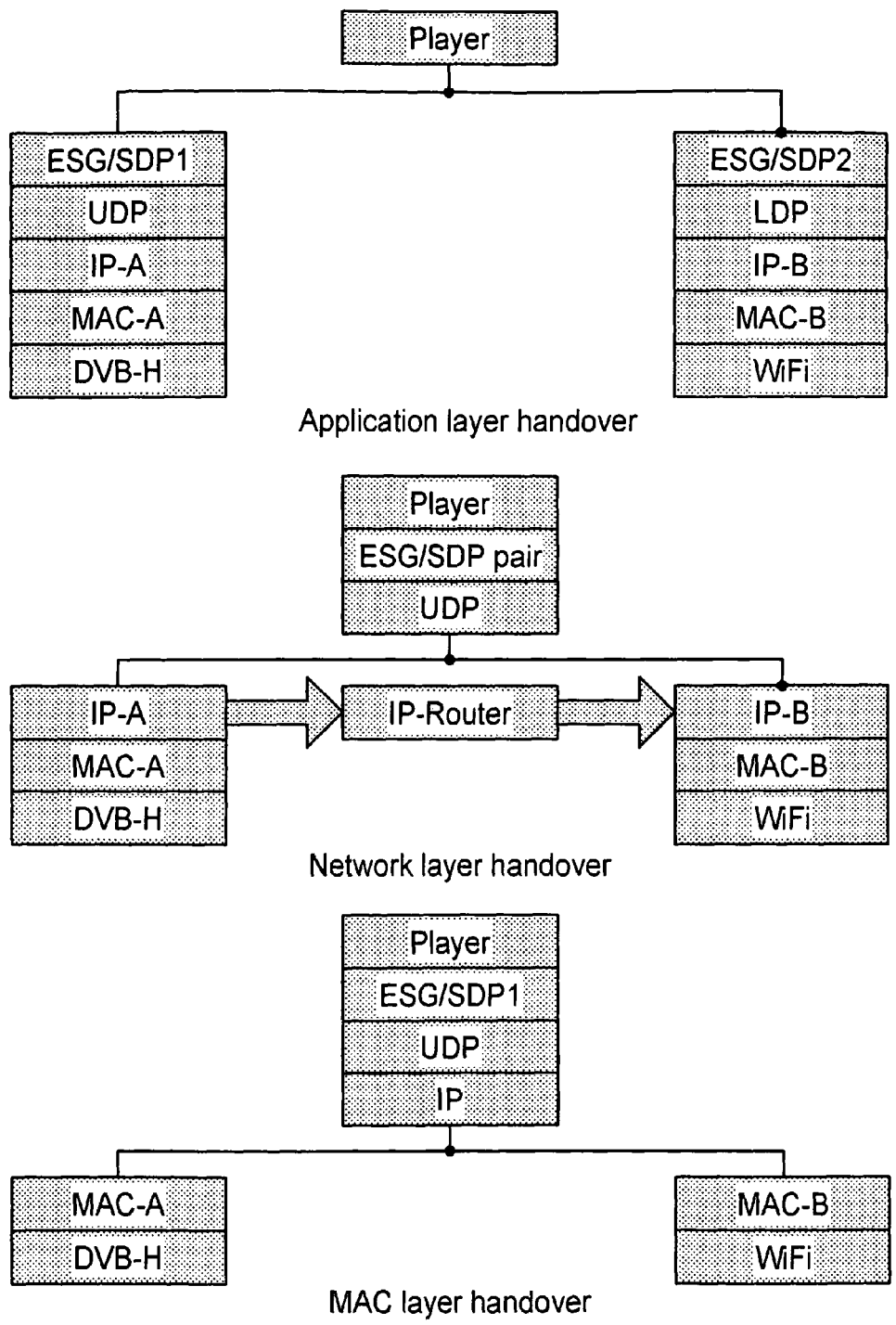
FIG. 3B gives details of the access network switch at different levels.

FIG. 3B illustrates the three protocol stacks for handover at three different protocol layers. The dashed boxes of the handover process may have different meanings/implementations/processes at the different protocol layers. At the application layer, the handover process is a user action to take a program in the ESG from the second access network (e.g. WiFi network) while switching off the current program from the first access network (e.g., DVB-H network). At the network layer, the handover process is a program detecting the signal strength and the signal quality. The handover process then switches the socket binding interface from interface-A to interface-B and forwards IP packets from interface-A to interface-B for a certain period of time. At the MAC layer, since IP packets from both interface A and interface B use the same multicast address, the IP packets all can be received by the socket of the player device. In this case, only one interface is used at a time. The handover process may based on the signal strength and/or signal quality to enable one interface and disable the other. During the handover process, there is a short period of time in which both interfaces are enabled.

It is assumed that there is a function that can drop the duplicate packets and re-order the mis-ordered packets before the mis-ordered packets are sent to decoder in the player device.

Figure 4:
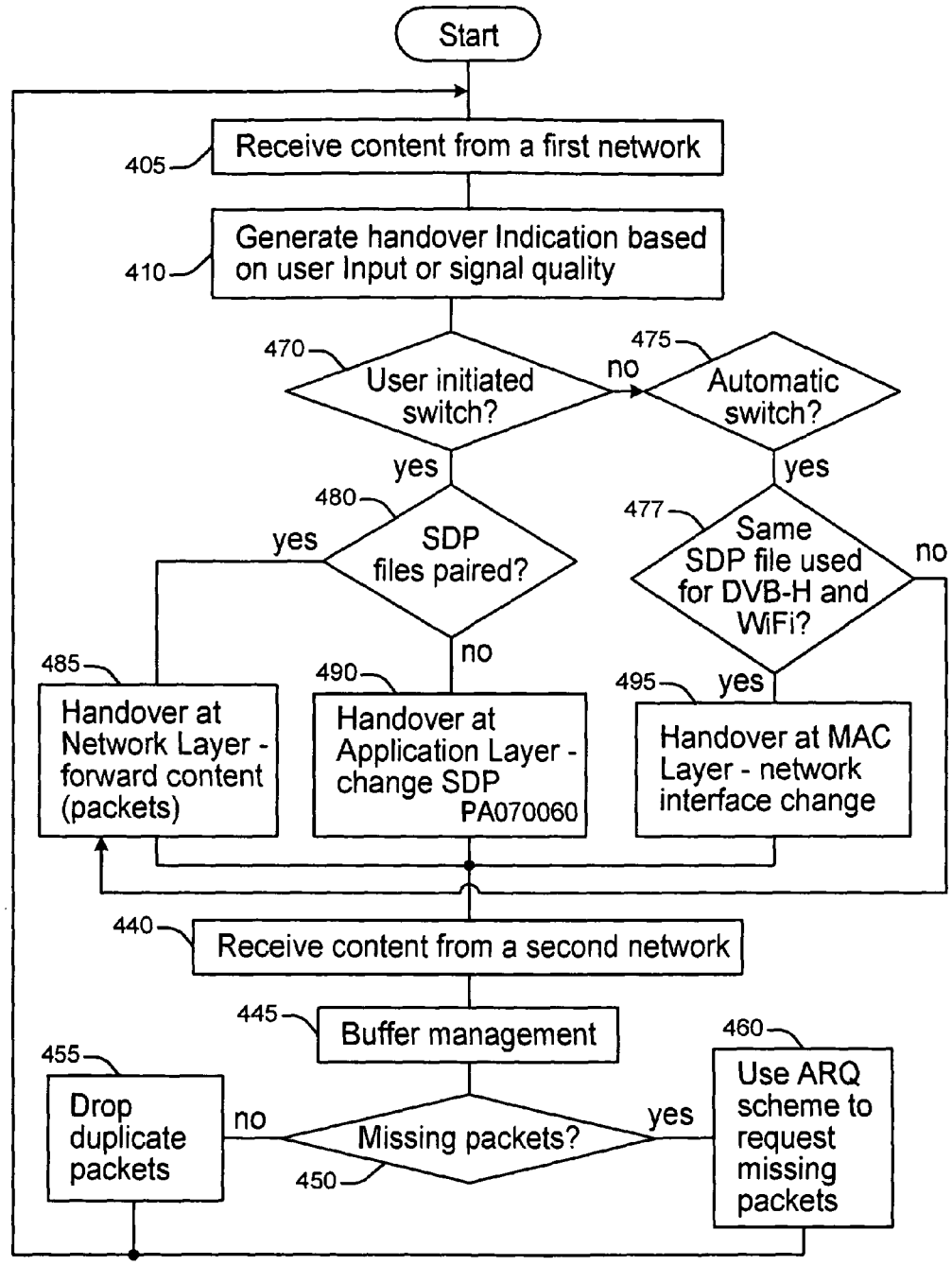
FIG. 4 is a flowchart of an exemplary handover process in the mobile terminal/device in accordance with the principles of the present invention.

FIG. 4 is a flowchart of an exemplary handover process in the mobile terminal/device in accordance with the principles of the present invention. A mobile terminal/device receives content from a first network, e.g., a DVB-H network, at 405. At 410 a handover indication is generated based on user input or signal quality or signal strength. A handover indication is received at 465. A test is performed at 470 to determine if a user of the mobile terminal/device has directed switching (handing over) to a second network, e.g., a WiFi network. If the user has not directed switching to the second network then a test is performed at 475 to determine if an automatic switch to a second network is to be made based on signal quality or signal strength. If an automatic switch is not to be made then the dual mode mobile terminal/device of the present invention continues to receive content from the first network at 465. If there is to be an automatic switch based on signal quality or signal strength then a test is performed at 477 to determine if the switch will be performed at the MAC layer. Performance at the network layer or the MAC layer is based on whether the same SDP file can be used for DVB-H transmission/signal and WiFi transmission/signal. If the switch will be performed at the MAC layer and the network interfaces will be exchanged at 495. If the switch will be performed at the network layer then the content will be forwarded in packets at 485. If the user has directed that access be switched from the first network to the second network then a test is performed at 490 to determine if the SDP files are paired/associated. If the SDP files are paired/associated then the switch will be performed at the network layer and the content will be forwarded in packets at 485. If the SDP files are not paired/associated then the switch will be performed at the application layer and the SDP files be exchanged the SDP files at 490.

The content will be received via the second network at 440. At 445 buffer management is handled. Specifically, a test is performed at 450 to determine if there are any missing packets. If there are no missing packets then any duplicate packets of content are removed at 455.

It is reasonable to assume that the WiFi stream (content) is always delayed more than the DVB-H stream (content). This means that there is always a gap in the content when switching from a WiFi network to a DVB-H network. This gap cannot be covered. If there are any missing packets of content then the missing packets are requested via the ARQ mechanism at 460. It is assumed for purposes of this flowchart that there will only be missing packets if the switch is from using a DVB-H network to using a WiFi network. The ARQ mechanism is used to request missing packets from the WiFi network not the DVB-H network. The network, which is denoted as the first network, and the network, which is denoted as the second network, may be interchanged either at 440, 455 or 460. This simply makes it easier to loop within the flowchart. With respect to the ARQ mechanism, it is commonly used in unicast. In multicast/broadcast case, the ARQ mechanism can also be used to decrease the end-to-end packet loss rate by recovering missing/lost packets. This is true because, in a WiFi network, the connection is bi-directional. It should, however, be noted that a special ARQ mechanism is applied to handle ACK/NACK suppression at the server.

Figure 5:
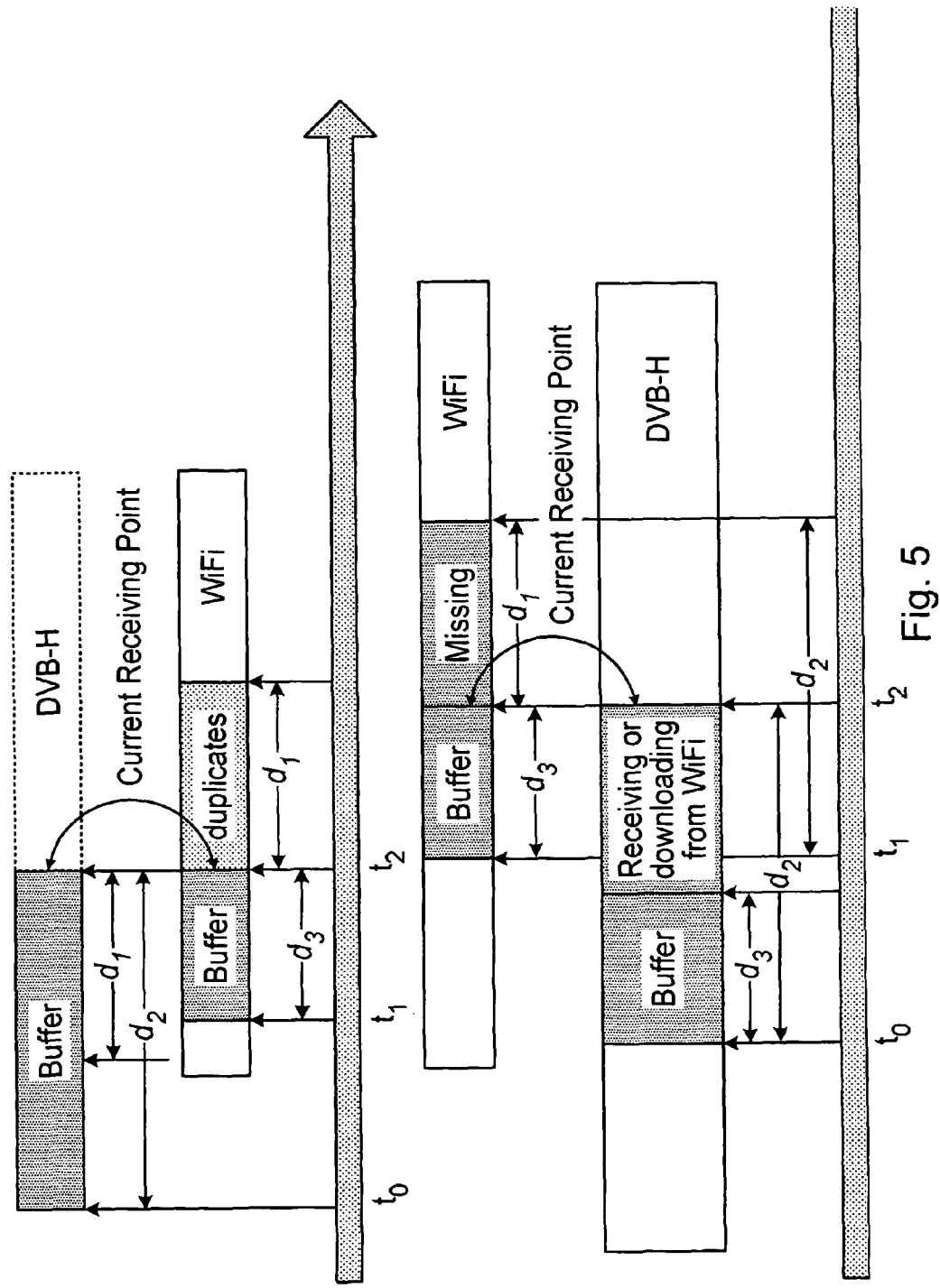
FIG. 5 illustrates the buffer status while switching between a DVB-H system and a WiFi network.

FIG. 5 shows the buffering two un-synchronized video streams (content) for playback. Without loss of generality, it is assumed that the WiFi streams are always delayed more than DVB-H streams. Let the delay difference between DVB-H and WiFi be $d_1$, the total buffer for the content stream at the player is $d_2$.

Assuming the client/mobile terminal/device starts out receiving content from the DVB-H network, the player (in the mobile device/terminal) needs to buffer a length of $d_2$ at the beginning before starting content playback. As shown in FIG. 5, there are two shaded bars showing timing, $t_0$ is current playback point in DVB-H buffer, and $t_2$ is the current time, where $t_2=t_0+d_2 \cdot t_1$ is the current playback point in WiFi buffer.

When the client switches from DVB-H network to WiFi network, since the WiFi content stream has $d_1$ delay, the current streaming packets (content) from WiFi is already in the buffer. There is data of length $d_1$ which is duplicated and the duplicate content packets will be dropped. After switching to a WiFi network, as shown in the second row of FIG. 5, the content packets that are received are duplicates of those already in the buffer and are dropped until the buffer length is reduced to $d_3=d_2-d_1$.

When the client switches from a WiFi network to the DVB-H network, there is a $d_1$ length of data already transmitted by the DVB-H system, which is missing because of the delay difference, the stream (content), thus, cannot be continuously played back if the client immediately switches to DVB-H. The options are 1) let the client receive data from both WiFi and DVB-H for a length of data $d_1$, and 2) use a special ARQ mechanism discussed above to request downloading the missing content of the packets from a content server through the WiFi network before the dual mode mobile device/terminal switches to the DVB-H network, if network conditions allow. Since the required data is the current streaming data for WiFi, it may not be available immediately on the server in the WiFi network. However, it may be possible to obtain the data directly from the server for the DVB-H network. If it is not possible to use ARQ to obtain the missing packets (content), every time the client/mobile terminal/device switches from the WiFi (slower) to DVB-H (faster) channel, there will be a jitter for a period of $d_1$.

A determination of delay difference $d_1$ can be made by checking the time stamps of a video/content stream on a dual mode interface phone in accordance with the present invention, which can receive content streams from both networks at the same time. Delay difference $d_1$ may drift and vary from one hotspot to another. In view of the possible drifting and variation, buffer length $d_2$ is determined based both on the playback rate of the selected content and the delay difference and could be continually updated as to size or a maximum size could be selected based on worst case conditions. Buffer length $d_2$ must be greater than delay difference $d_1$ for non interruptive playback on handover.

Figures 6A, 6B:
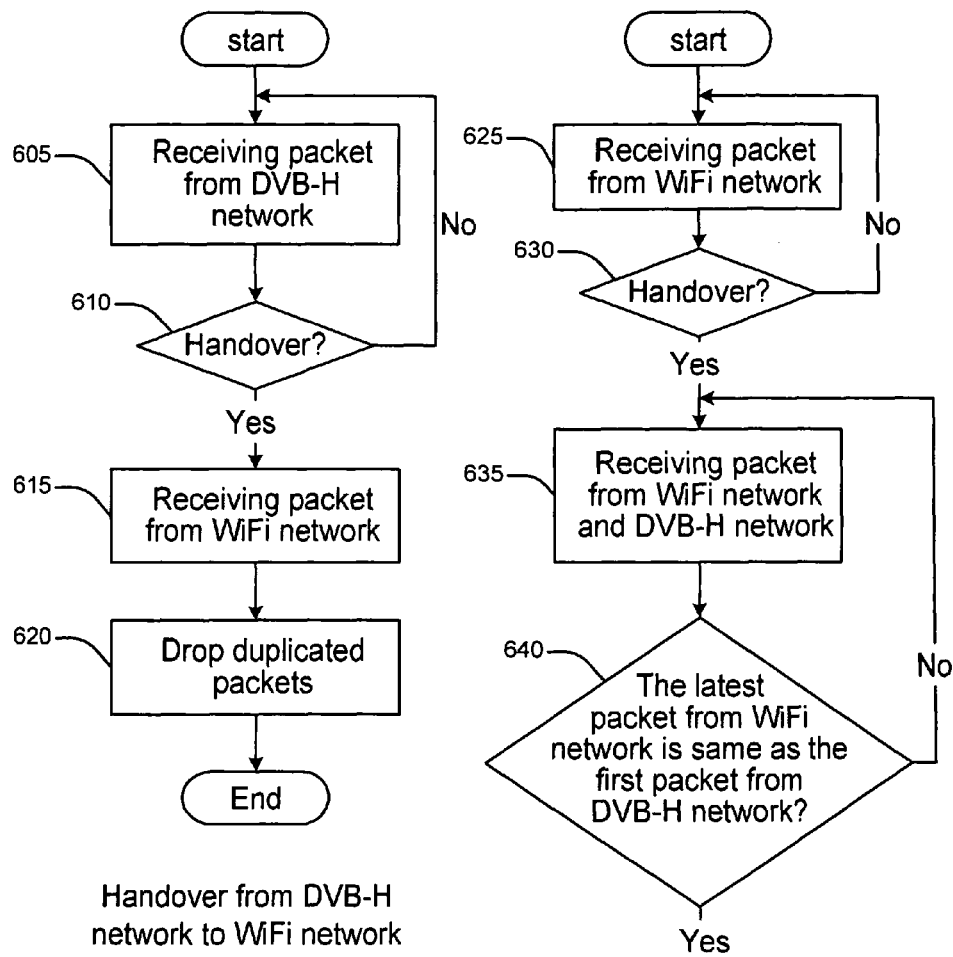
FIG. 6A is a flowchart of the handover process from a DVB-H system to a WiFi network.
FIG. 6B is a flowchart of the handover process from a WiFi network to a DVB-H system.

FIG. 6A is a flowchart of the handover process from a DVB-H system to a WiFi network. At 605, the mobile terminal/device receives a packet of content from the DVB-H system. A determination is made at 610, if a handover is in process. If a handover is not in process, then the process returns to 605. If, however, a handover is in process, then at 615 the mobile terminal/device starts receiving packets of content from the WiFi network. At 620, any duplicate packets in the buffer are dropped.

FIG. 6B is a flowchart of the handover process from a WiFi network to a DVB-H system. At 625, the mobile terminal/device receives a packet of content from the WiFi network. A determination is made at 630 if a handover is in process. If a handover is not in process, then the process returns to 625. If, however, a handover is in process, then at 635 the mobile terminal/device receives packets of content from both the WiFi network and the DVB-H system. A determination is made at 640 if the latest packet of content from the WiFi network is the same as the first packet of content received from the DVB-H system. If the latest packet of content from the WiFi network is not the same as the first packet of content received from the DVB-H system then the mobile terminal/device returns to 635 and continues to receive the next packet of content from both the WiFi network and the DVB-H system. This also means that missing packets of content can be requested using an ARQ mechanism that has ACK/NACK suppression. If, however, the latest packet of content from the WiFi network is the same as the first packet of content received from the DVB-H system, then the mobile terminal/device receives packets of content from the DVB-H system only.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for content delivery to a mobile device, said method comprising:
   receiving content from a first network, wherein said first network is a digital video broadcast network for handheld devices;
   measuring a delay difference for streaming content between said first network and a second network;
   choosing a buffer size larger than said delay difference between said first network and said second network;
   moving into a coverage area of a second network;
   performing a handover;
   receiving content from said second network; and
   dropping any duplicate content packets.

2. The method according to claim 1, wherein said second network is a wireless local area network.

3. The method according to claim 1, further comprising:
   storing content received from said first network in a buffer of said mobile device; and
   storing content received from said second network in said buffer of said mobile device.

4. The method according to claim 1, wherein said handover is performed responsive to user input.

5. The method according to claim 1, wherein said handover is performed handover based on one of better signal quality and better signal strength in said coverage area of said second network.

6. An apparatus for content delivery to a mobile device, comprising:
   means for receiving content from a first network, wherein said first network is a digital video broadcast network for handheld devices;
   means for measuring a delay difference for streaming content between said first network and a second network;
   means for choosing a buffer size larger than said delay difference between said first network and said second network;
   means for moving into a coverage area of a second network;
   means for performing a handover;
   means for receiving content from said second network; and
   means for dropping any duplicate content packets.

7. The apparatus according to claim 6, wherein said second network is a wireless local area network.

8. The apparatus according to claim 6, wherein said handover is performed responsive to user input.

9. The apparatus according to claim 6, wherein said handover is performed based on one of better signal quality and better signal strength in said coverage area of said second network.

10. An apparatus for content delivery to a mobile device, comprising:
    means for receiving content from a first network, wherein said first network is a digital video broadcast network for handheld devices;
    means for measuring a delay difference for streaming content between said first network and a second network;
    means for choosing a buffer size larger than said delay difference between said first network and said second network;
    means for moving into a coverage area of a second network;
    means for performing a handover;
    means for receiving content from said second network; and
    means for dropping any duplicate content packets.

11. The apparatus according to claim 10, wherein said first network is a wireless local area network.

12. The method according to claim 10, further comprising:
    storing content received from said first network in a buffer of said mobile device; and
    storing content received from said second network in said buffer of said mobile device.

13. The method according to claim 10, further comprising:
    storing content received from said first network in a first buffer of said mobile device; and
    storing content received from said second network in a second buffer of said mobile device.

14. The method according to claim 10, wherein said handover is performed responsive to user input.

15. The method according to claim 10, wherein said handover is performed handover based on one of better signal quality and better signal strength in said coverage area of said second network.

16. An apparatus for content delivery to a mobile device, comprising:
    means for receiving content from a first network;
    means for measuring a delay difference for streaming content between said first network and a second network;
    means for choosing a buffer size larger than said delay difference between said first network and said second network;
    means for performing a handover;
    means for receiving content from a second network, wherein said second network is a digital video broadcast network for handheld devices; and
    means for determining if any content is missing.

17. The apparatus according to claim 16, further comprising:
    means for storing content received from said first network in a buffer of said mobile device; and
    means for storing content received from said second network in said buffer of said mobile device.

18. The apparatus according to claim 16, further comprising:
    means for storing content received from said first network in a first buffer of said mobile device; and
    means for storing content received from said second network in a second buffer of said mobile device.

19. The apparatus according to claim 16, wherein said first network is a wireless local area network.

20. The apparatus according to claim 16, wherein said handover is performed responsive to user input.

21. The apparatus according to claim 16, wherein said handover is performed based on one of better signal quality and better signal strength in said coverage area of said second network.

* * * * *